(12) United States Patent
Clegg

(10) Patent No.: US 12,335,746 B2
(45) Date of Patent: Jun. 17, 2025

(54) DUAL BAND LTE SMALL CELL

(71) Applicant: ESTELGIA, LLC, Dover, DE (US)

(72) Inventor: Michael Clegg, Campbell, CA (US)

(73) Assignee: ESTELGIA, LLC ( * ) Notice: Subject to any disclaimer, the term of this patent is extended or adjusted under 35 U.S.C. 154(b) by 0 days.

(21) Appl. No.: 18/297,639

(22) Filed: Apr. 9, 2023

(65) Prior Publication Data

US 2023/0422046 A1 Dec. 28, 2023

Related U.S. Application Data

(63) Continuation of application No. 16/806,195, filed on Mar. 2, 2020, now Pat. No. 11,653,219, which is a
(Continued)

(51) Int. Cl.
H04W 24/08 (2009.01)
H04L 5/00 (2006.01)
H04L 5/14 (2006.01)
H04W 16/16 (2009.01)
H04W 36/22 (2009.01)
H04W 48/00 (2009.01)
H04W 72/23 (2023.01)
H04W 72/542 (2023.01)
(Continued)

(52) U.S. Cl.
CPC .......... *H04W 16/16* (2013.01); *H04L 5/0062* (2013.01); *H04L 5/14* (2013.01); *H04W 24/08* (2013.01); *H04W 36/22* (2013.01); *H04W 48/17* (2013.01); *H04W 72/23* (2023.01); *H04W 72/542* (2023.01); *H04W 16/32* (2013.01); *H04W 84/042* (2013.01); *H04W 88/10* (2013.01)

(58) Field of Classification Search
CPC ..... H04W 16/16; H04W 16/32; H04W 24/08; H04W 36/22; H04W 48/17; H04W 72/23; H04W 72/542; H04L 5/0062; H04L 5/14
See application file for complete search history.

(56) References Cited

U.S. PATENT DOCUMENTS 8,437,790 B1  5/2013  Hassan et al.
8,948,771 B2  2/2015  Koskela et al.
(Continued)

FOREIGN PATENT DOCUMENTS

CN  101645744 A  2/2010
CN  101651700 A  2/2010
WO  WO-2012026857 A1  3/2012

OTHER PUBLICATIONS

Extended Search Report issued for European Patent Application No. 13172162.3, dated Apr. 29, 2015; 8 pages.
(Continued)

*Primary Examiner* — Meng Vang
*Assistant Examiner* — Hector Reyes
(74) *Attorney, Agent, or Firm* — BROADVIEW IP LAW, PC

(57) ABSTRACT

A dual band LTE small cell base station communicates on both licensed bands and unlicensed bands. The small cell base station modifies the communication protocol utilized by the licensed band to enable communication over an unlicensed band. This modification involves replacing the physical (PHY) layer of the licensed band communication protocol with the PHY layer of a to-be-used protocol in an unlicensed band.

20 Claims, 10 Drawing Sheets

Related U.S. Application Data continuation of application No. 14/494,553, filed on Sep. 23, 2014, now Pat. No. 10,582,395, which is a continuation of application No. 13/523,645, filed on Jun. 14, 2012, now Pat. No. 8,874,124.

(51) Int. Cl.
*H04W 16/32* (2009.01)
*H04W 84/04* (2009.01)
*H04W 88/10* (2009.01)

(56) References Cited

U.S. PATENT DOCUMENTS

| | | | |
|---|---|---|---|
| 9,107,172 | B1 | 8/2015 | Epstein |
| 10,129,759 | B2 | 11/2018 | Clegg |
| 2002/0136184 | A1 | 9/2002 | Liang et al. |
| 2003/0115261 | A1 | 6/2003 | Mohammed |
| 2004/0054766 | A1 | 3/2004 | Vicente |
| 2004/0063458 | A1 | 4/2004 | Hori et al. |
| 2004/0146021 | A1 | 7/2004 | Fors et al. |
| 2006/0268924 | A1* | 11/2006 | Marinier ........... H04W 74/0816 370/445 |
| 2007/0026868 | A1 | 2/2007 | Schulz et al. |
| 2007/0076649 | A1 | 4/2007 | Lin et al. |
| 2007/0249390 | A1 | 10/2007 | Purkayastha et al. |
| 2008/0151821 | A1 | 6/2008 | Cho et al. |
| 2008/0259859 | A1 | 10/2008 | Cordeiro et al. |
| 2009/0137247 | A1 | 5/2009 | Mok |
| 2010/0054147 | A1 | 3/2010 | Ishii |
| 2010/0173667 | A1 | 7/2010 | Hui et al. |
| 2010/0195580 | A1* | 8/2010 | Samarasooriya ..... H04W 16/14 370/329 |
| 2010/0246506 | A1* | 9/2010 | Krishnaswamy ... H04W 72/542 709/227 |
| 2011/0022714 | A1 | 1/2011 | Nobukiyo |
| 2011/0103428 | A1 | 5/2011 | Chan |
| 2011/0228666 | A1 | 9/2011 | Barbieri et al. |
| 2011/0287794 | A1* | 11/2011 | Koskela ............... H04W 36/22 455/509 |
| 2012/0020258 | A1 | 1/2012 | Linsky |
| 2012/0039284 | A1 | 2/2012 | Barbieri et al. |
| 2012/0052857 | A1 | 3/2012 | Kumar et al. |
| 2012/0063373 | A1 | 3/2012 | Chincholi et al. |
| 2012/0063383 | A1 | 3/2012 | Barbieri et al. |
| 2012/0120892 | A1 | 5/2012 | Freda et al. |
| 2012/0207033 | A1* | 8/2012 | Hakola ................. H04W 16/14 370/252 |
| 2012/0236806 | A1 | 9/2012 | Doppler et al. |
| 2012/0250631 | A1 | 10/2012 | Hakola et al. |
| 2012/0252442 | A1 | 10/2012 | Fu et al. |
| 2012/0257585 | A1 | 10/2012 | Sydor et al. |
| 2012/0282942 | A1 | 11/2012 | Uusitalo et al. |
| 2012/0307748 | A1 | 12/2012 | Cheng et al. |
| 2012/0307869 | A1* | 12/2012 | Charbit ................. H04B 1/715 375/132 |
| 2013/0039284 | A1 | 2/2013 | Marinier et al. |
| 2013/0064103 | A1 | 3/2013 | Koskela et al. |
| 2013/0088983 | A1 | 4/2013 | Pragada et al. |
| 2013/0155991 | A1 | 6/2013 | Kazmi et al. |
| 2013/0196632 | A1 | 8/2013 | Horn et al. |
| 2013/0294356 | A1 | 11/2013 | Bala et al. |
| 2013/0315152 | A1 | 11/2013 | Ratasuk et al. |
| 2013/0344883 | A1 | 12/2013 | Rinne et al. |
| 2014/0010086 | A1 | 1/2014 | Etemad et al. |
| 2014/0031054 | A1 | 1/2014 | Zou et al. |
| 2014/0043979 | A1 | 2/2014 | Etemad et al. |
| 2014/0247743 | A1* | 9/2014 | Seo .................... H04W 48/16 370/252 |
| 2014/0321313 | A1 | 10/2014 | Seo et al. |
| 2015/0043363 | A1 | 2/2015 | Koskinen et al. |
| 2015/0043471 | A1 | 2/2015 | Rinne et al. |
| 2015/0071239 | A1* | 3/2015 | Zhang .................. H04W 72/56 370/329 |
| 2015/0334643 | A1 | 11/2015 | Maaref et al. |
| 2015/0350949 | A1 | 12/2015 | Wang et al. |
| 2017/0006607 | A1 | 1/2017 | Etemad et al. |

OTHER PUBLICATIONS

Feilu Liu et al. "A framework for femtocells to access both licensed and unlicensed bands" Modeling and Optimization in Mobile, Adhoc and Wireless Networks (WIOPT), 2011 International Symposium on IEEE, May 9, 2011, pp. 407-411.

Muhammad Imadur Rahman et al. "License-exempt LTE systems for secondary spectrum usage: Scenarios and first assessment" IEEE International Symposium on New Frontiers in Dynamic Spectrum Access Networks (AACHEN): Dyspan (AACHEN); Picataway, NJ. May 3, 2011; pp. 349-358.

Office Action issued by Chinese Patent Office for Application No. 201310233942.X, dated Sep. 18, 2017; 18 pages with English language translation.

* cited by examiner

DUAL BAND LTE SMALL CELL

CROSS-REFERENCE TO RELATED APPLICATIONS

The present application is a continuation of Ser. No. 16/806,195, filed Mar. 2, 2020, and entitled "DUAL BAND LTE SMALL CELL", which is a continuation of U.S. patent application Ser. No. 14/494,553, filed Sep. 23, 2014, issued as U.S. Pat. No. 10,582,395 on Mar. 3, 2020, and entitled "DUAL BAND LTE SMALL CELL", which is a continuation of U.S. patent application Ser. No. 13/523,645, filed Jun. 14, 2012, issued as U.S. Pat. No. 8,874,124 on Oct. 28, 2014, and entitled "DUAL BAND LTE SMALL CELL", the disclosures of which are incorporated by reference herein in their entirety.

TECHNICAL FIELD

Aspects of the present disclosure generally relate to wireless communication systems, and more particularly, to a small cell communicating in an unlicensed band utilizing a modified licensed band protocol, such as a modified LTE protocol.

BACKGROUND OF THE DISCLOSURE

In cellular networks, femtocells are served by low-power base stations that are typically installed at residential-type locations, such as a user's home or small business. Femtocells are considered to be effective mechanisms for increasing network capacity and expanding network coverage, but are subject to limitations. Femtocell deployment can be cost prohibitive because femtocells implement relatively expensive technology and are subject to constraints and/or discrepancies among cellular operators. Also, femtocells share licensed bands with other network cells, e.g., macrocells, picocells, and other femtocells, and therefore, are subject to interference as user traffic increases on those licensed bands.

In an effort to alleviate interference on licensed bands, cellular operators sometimes provide access points operating on unlicensed bands, e.g., WiFi. However, this practice is restrictive because it often does not provide an effective means for voice communications. Also, while mobile devices may be able to access both licensed bands and unlicensed bands, they cannot access both bands simultaneously. As such, users are forced to choose between one of unlicensed or licensed communications.

SUMMARY OF THE DISCLOSURE

In one aspect of the present disclosure, a small cell base station is implemented within a network to accommodate high density traffic areas such as urban areas, shopping malls, enterprise and campus areas, hotspots, and the like. A method of wireless communication includes considering, at a small cell base station, an indication to communicate on an unlicensed band. The method also includes selecting, at the small cell base station, an unlicensed band for communication based upon the considering. The method includes modifying, at the small cell base station, a licensed band communication protocol to enable communication on the selected unlicensed band. The method further includes transmitting, from the small cell base station, data on the selected unlicensed band using the modified licensed band communication protocol to a user equipment.

In another aspect of the present disclosure, an apparatus configured for wireless communication includes at least one processor and a memory coupled to the at least one processor. The processor is configured to receive and consider an indication to communicate on an unlicensed band. The processor is further configured to select an unlicensed band for communication based upon the considering. The processor is also configured to modify a licensed band communication protocol to enable communication on the selected unlicensed band. Also, the processor is configured to transmit data on the selected unlicensed band using the modified licensed band communication protocol to user equipment.

In another aspect of the present disclosure, a method of wireless communication includes considering, at a user equipment, an indication to communicate on an unlicensed band. The method also includes transmitting, from the user equipment, a signal indicating a preference for communicating on the unlicensed band. The method further includes receiving, at the user equipment, data transmitted from a small cell base station, the data received on an unlicensed band according to a modified licensed band communication protocol.

In another aspect of the present disclosure, an apparatus configured for wireless communication includes at least one processor and a memory coupled to the at least one processor. The processor is configured to consider an indication to communicate on an unlicensed band. The processor is also configure to transmit a signal indicating a preference for communicating on the unlicensed band. The processor is further configured to receive data transmitted from a small cell base station, the data received on an unlicensed band according to a modified licensed band communication protocol.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION OF THE DISCLOSURE

Figure 1:
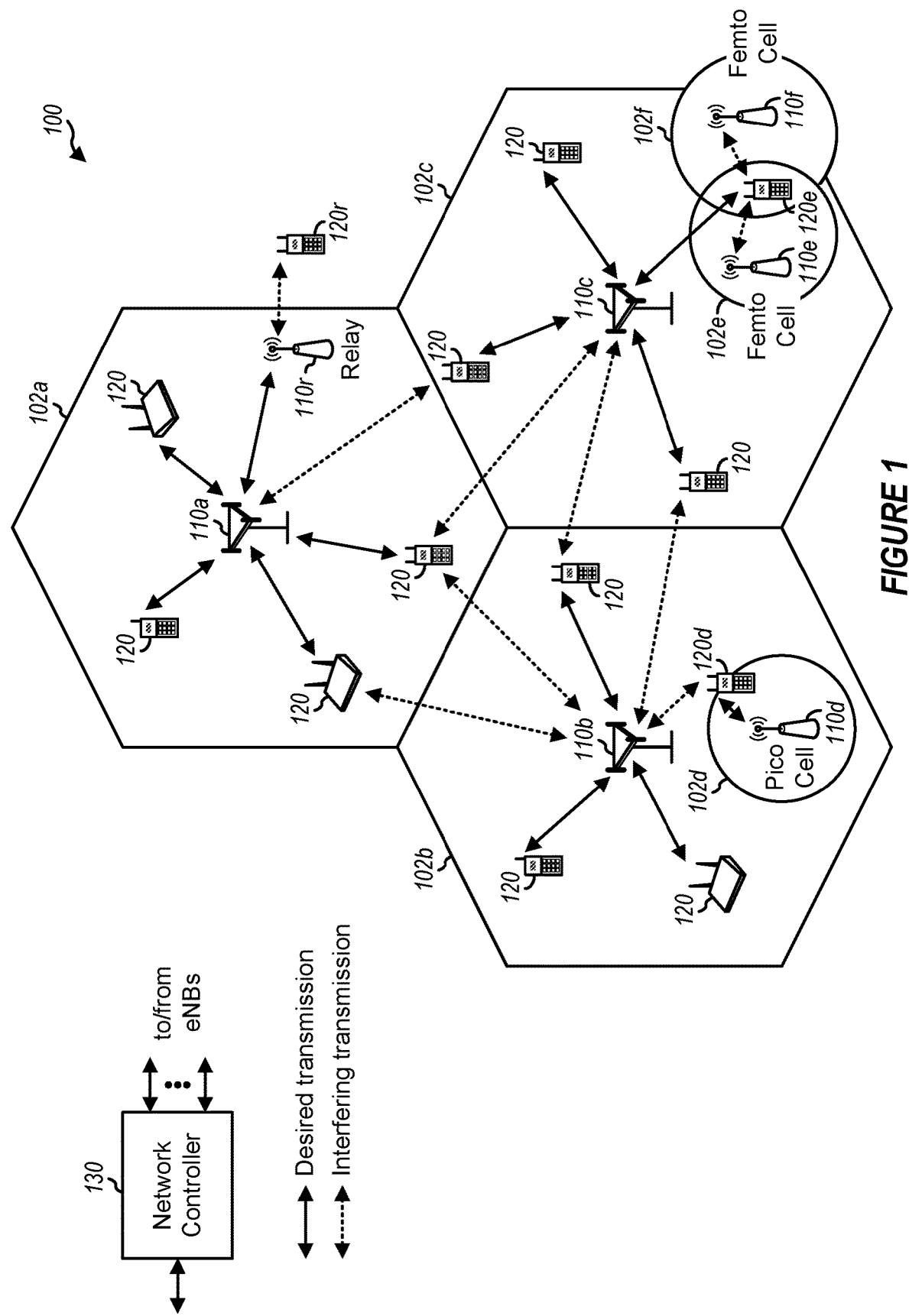
FIG. 1 is a block diagram illustrating an example of a communications system according to certain aspects of the present disclosure.

Aspects of the present disclosure provide improved wireless communications in cellular networks by implementing small cells to accommodate high density traffic areas such as urban areas, shopping malls, enterprise and campus areas, hotspots, and the like. According to aspects, a small cell exploits both licensed bands and unlicensed bands to avoid the otherwise necessary expense of paying for licensed cellular services and interference on licensed bands as cellular network capacity is exceeded. That is, a small cell utilizes both licensed bands and unlicensed bands to 1) improve network capacity and coverage, while 2) avoiding user interference on licensed bands. According to one aspect, a small cell base station modifies the communication protocol utilized by the licensed band to enable communication over an unlicensed band. This modification may involve replacing the physical (PHY) layer of the licensed band communication protocol with the PHY layer of a to-be-used protocol in an unlicensed band. According to another aspect, the small cell base station is configured to communicate over licensed bands according to LTE protocol. In that case, the small cell base station may substitute an unlicensed air interface (e.g., 802.11n) for a licensed air interface (e.g., LTE-A). Doing so takes advantage of improvements associated with LTE and the freedom associated with unlicensed communication.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 illustrates a wireless communication network 100, which may be an LTE network. Wireless network 100 includes a number of evolved node Bs (eNodeBs) 110 and other network entities. An eNodeB may be a station that communicates with user equipment (UE) and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

Wireless network 100 may be a heterogeneous network that includes eNodeBs of different types, e.g., macro eNodeBs, pico eNodeBs, femto eNodeBs, relays, etc. Accordingly, an eNodeB may provide communication coverage for a macro cell, a pico cell, a femtocell, a small cell, and/or other types of cell. In the example shown in FIG. 1, the eNodeBs 110a, 110b, and 110c are macro eNodeBs serving macro cells 102a, 102b and 102c, respectively. The eNodeB 110d is a pico eNodeB serving pico cell 102d. The eNodeBs 110e and 110f are small cell eNodeBs serving small cells 102e and 102f, respectively. An eNodeB may support one or multiple (e.g., two, three, four, and the like) cells. A macro cell generally covers a relatively large geographic area (e.g., several kilometers in radius) and may allow unrestricted access by UEs with service subscriptions with the network provider. A pico cell generally covers a relatively smaller geographic area and may allow unrestricted access by UEs with service subscriptions with the network provider. A femtocell generally covers a relatively small geographic area in a residential-type setting (e.g., a home or small business) and, in addition to unrestricted access, may also provide restricted access by UEs having an association with the femtocell (e.g., UEs in a closed subscriber group (CSG), UEs for users in the home, and the like). A small cell covers a relatively small geographic area in an urban-type setting (e.g., a shopping mall, enterprise area, etc.) and may provide unrestricted access and restricted access by UEs having an associate with the small cell. Finally, an eNodeB for a macro cell may be referred to as a macro eNodeB, an eNodeB for a pico cell may be referred to as a pico eNodeB, an eNodeB for a femtocell may be referred to as a femto eNodeB or a home eNodeB, and an eNodeB for a small cell may be referred to as a small cell eNodeB.

Preferred embodiments of the present disclosure are thought to be most advantageously implemented in a small cell environment, where providing small cell eNodeB and UE communications over licensed and unlicensed bands will relieve network burden from particularly high traffic density in those environments. However, aspects of the present disclosure may be advantageously implemented in other cell environments, such as femtocells. Small cell eNodeBs 110e and 110f of the illustrated system comprise a small base station providing operation mimicking or emulating that of a base station, such as base station 110c. That is, small cell eNodeBs 110e and 110f provide an air interface to mobile devices or user equipment, such as 120e, which functions the same as the air interface provided by a typical base station (e.g., utilizes frequencies, channels, protocols, etc. native to the network), albeit at perhaps lower transmission power due to the typically smaller size of the small cell coverage area. For example, small cell eNodeBs 110e and 110f may comprise a universal mobile telecommunications (UMTS) configured base station containing a Node B, RNC, and general packet radio service support node (GSN) with Ethernet for backhaul through packet switched network 100. Additionally or alternatively, small cell eNodeBs 110e and 110f may comprise a configuration compatible with other communications solutions, such as GSM, CDMA2000, WiMAX, and/or WiFi.

It should be appreciated that the coverage areas provided by eNodeBs of network 100 may not provide adequate coverage of all areas in which users wish to operate mobile devices for communication services. For example, coverage gaps, coverage shadows, etc. may exist in various areas, such as within a building, on the far side of a mountain or other terrain, etc. Likewise, coverage may not be adequate in certain areas to accommodate high traffic density, such as in dense urban areas, etc. Accordingly, small cell base stations, such as small cell eNodeBs 110e and 110f, are utilized to provide communication services within areas otherwise not serviced or inadequately serviced by network 100. A UE may be within the coverage of multiple eNodeBs. One of these eNodeBs may be selected to serve the UE. The serving eNodeB may be selected based on various criteria such as received power, path loss, signal-to-noise ratio (SNR), etc.

Aspects of network 100 provide a packet switched network data gateway facilitating data packet communication between devices, such as small cell eNodeBs 110e and 110f, and other devices of network 100. For example, network 100 may provide interfacing, link security, protocol conversion, data packet routing, and/or other functions for network edge devices, such as small cell eNodeBs 110e and 110f.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via an X2 interface, wireless backhaul or a wireline backhaul, and the like.

UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, small cell eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

Figure 2:
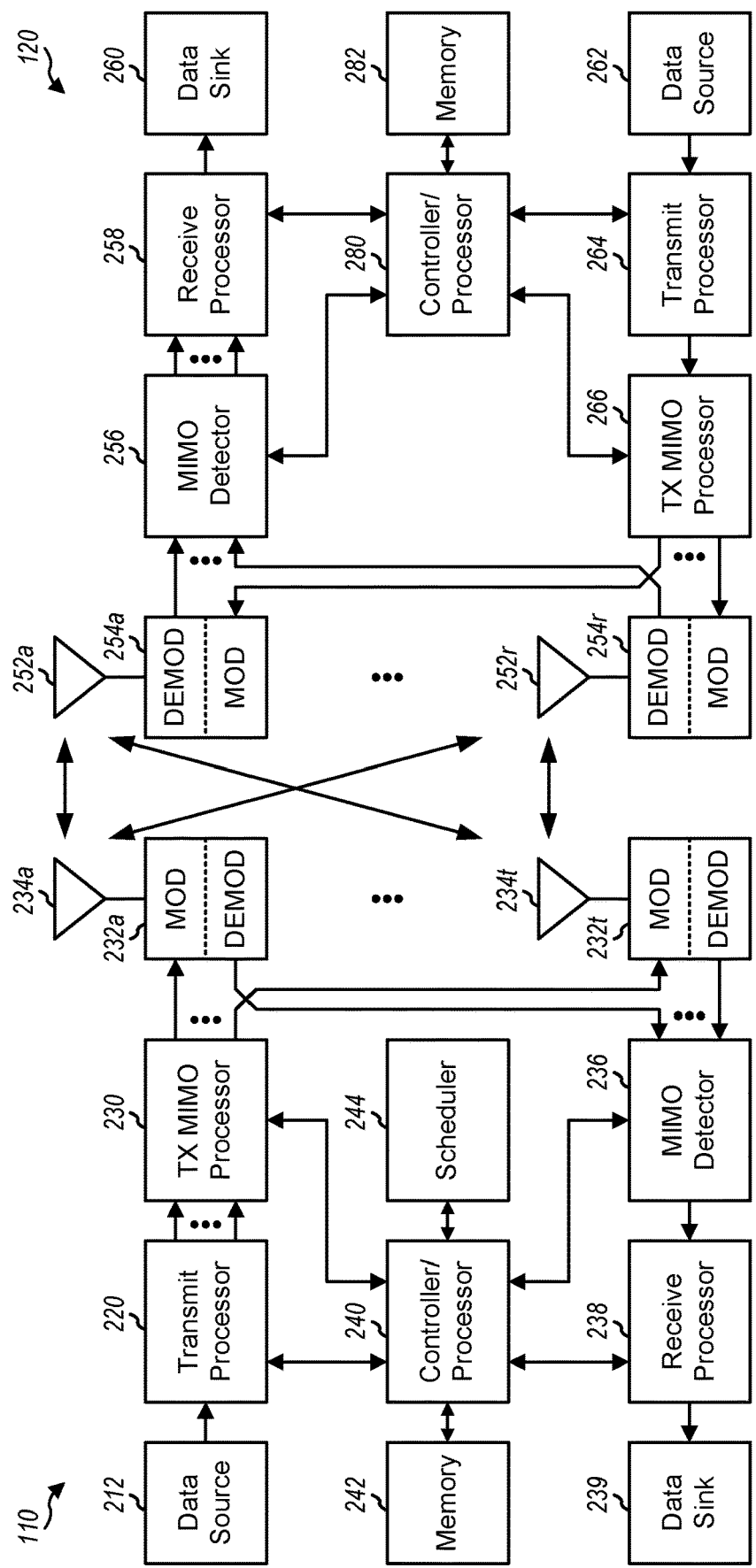
FIG. 2 is a block diagram illustrating a design of a base station/eNodeB and a UE configured according to one aspect of the present disclosure.

FIG. 2 is a block diagram of a design of a base station/eNodeB 110 and a UE 120, which may be one of the base stations/eNodeBs and one of the UEs in FIG. 1. The base station 110 may be small cell eNodeB 110e or 110f in FIG. 1, and the UE 120 may be the UE 120e. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The control information may be for the PBCH, PCFICH, PHICH, PDCCH, etc. The data may be for the PDSCH, etc. The processor 220 may process (e.g., encode and symbol map) the data and control information to obtain data symbols and control symbols, respectively. The processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 110. At the base station 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240. The base station 110 can send messages to other base stations, for example, over an X2 interface.

The controllers/processors 240 and 280 may direct the operation at the base station 110 and the UE 120, respectively. The processor 240 and/or other processors and modules at the base station 110 may perform or direct the execution of various processes for the techniques described herein. The processor 280 and/or other processors and modules at the UE 120 may also perform or direct the execution of the functional blocks relating to base stations and/or other processes for the techniques described herein. The memories 242 and 282 may store data and program codes for the base station 110 and the UE 120, respectively. A scheduler 244 may schedule UEs for data transmission on the downlink and/or uplink.

According to an aspect of the present disclosure, a small cell base station, such as small cell eNodeB 110*e*, communicates with a UE, such as UE 120*e*, over an unlicensed band utilizing LTE. The small cell base station may utilize the unlicensed frequency band for both the uplink (UL) and downlink (DL), e.g., shared by UL and DL according to FDD or TDD communication schemes. According to one aspect, controller/processor 240 of eNodeB 11*e* is programmed in a manner such that the frequency band (licensed or unlicensed) that will be used to modulate signals transmitted by antennas 234 can be selected automatically or manually by the user. For example, controller/processor 240 may be designed in a manner so that it generates signals to be transmitted over a licensed frequency band of a mobile service provider or over an unlicensed band, or both. Such unlicensed frequency bands may include an (ISM) band. Also, transmit processor 220 and receive processor 238 may also be designed in a manner so that they process signals over various frequency bands.

According to an aspect of the present disclosure, a small cell eNodeB and UE communicate with one another using the LTE/LTE-A protocol over 1) an otherwise unavailable or under-utilized unlicensed frequency band, in addition to 2) typical licensed frequency bands reserved for LTE (e.g., LTE FDD frequency bands 1-25 and LTE TDD frequency bands 33-43). Examples of unlicensed bands used by the small cell eNodeB and UE include ISM bands such as those centered upon or about 2.4 GHz, 5.8 GHz, etc. As such, the small cell eNodeB and UE may communicate using LTE in unlicensed bands normally used by, e.g., WLAN devices, 802.11ac devices, 802.11c devices, cordless phones, and the like. Other unlicensed bands that may be utilized include locally unused satellite and TV bands. According to at least one implementation, the LTE protocol (e.g., the LTE radio stack) can be utilized by the small cell eNodeB and UE because, e.g., LTE is very close in modulation to 802.11ac and 802.11n and would fit within the 802.11ac and 802.11n channel structure of 20 MHz, 40 MHz and 80 MHz wide channels. Further, utilizing LTE on an ISM band is an attractive scheme because ISM bands are typically open for use if applicable regulation requirements are satisfied.

The ability of the small cell eNodeB and the UE to utilize LTE communications on different bands (such as an ISM band) in addition to traditional LTE licensed bands provides several advantages. Licensed frequency spectrum is operator-specific. As such, it is difficult to provide UEs that effectively operate across different operators. UEs configured to operate according to the concepts described herein provide off-the-shelf consumer devices that are not constrained by a specific operator. Also, the increase in cellular users has created additional need for capacity and a shortage of licensed spectrum. In being able to switch from high traffic licensed frequency bands while still utilizing LTE, the small cell eNodeB and UE provide additional capacity while avoiding undue burden on the licensed bands.

Decisions to initiate, maintain, and/or alternate between LTE communications on a licensed and unlicensed frequency bands can be made at both the small cell eNodeB and the UE. These decisions may be based upon different metrics or qualities (such as CQI, SNR, etc.) of a respective band measured at either of the small cell eNodeB and/or UE. Further, each of the eNodeB and UE may develop a priority of preferred bands, where, e.g., not only is a priority determined between a licensed and unlicensed band, but the available unlicensed bands are further prioritized with respect to one another. In this way, a small eNodeB may communicate with one or more UEs on both a set of licensed frequency bands and a set of unlicensed frequency bands in an optimal way.

Each of the small eNodeB and UE may perform one or a combination of steps to avoid or mitigate interference from devices communicating on a to-be-selected or previously-selected unlicensed band. Doing so allows the small eNodeB and UE to communicate in the unlicensed band using LTE with little or no modification to the LTE radio stack. By way of example, the small eNodeB and/or UE may perform a "monitor" function on one or more of the available unlicensed bands to determine which, if any, are more suitable. The monitor function may comprise monitoring one or more unlicensed bands to determine what devices are operating on that band, whether any communication is periodic or aperiodic, and the strength of interference on those bands. Further, the monitor function may be performed aperiodically (where, e.g., the small eNodeB and UE communicate on a licensed band), periodically (e.g., according to a preset interval or according to operator or system preferences), or continuously (where, e.g., the increased power requirements are justified by the extra bandwidth features).

The small eNodeB and/or UE may detect interference on one or more unlicensed bands, determine whether the detected interference is periodic or aperiodic, and then schedule LTE communications on the band to avoid the interference. On the other hand, the small eNodeB and/or UE may increase transmit power if interference on the unlicensed band cannot effectively be avoided. Additionally, the small eNodeB and/or UE may schedule transmission gaps, similar to a TDD scheme, to allow other devices to operate one the unlicensed band.

Further, according to one implementation, the small eNodeB and UE may exploit both the licensed and unlicensed frequency bands while still avoiding undue burden on the licensed spectrum. The small eNodeB and/or UE may communicate on shared bands where, e.g., control information is communicated on the licensed band while data is transmitted on the unlicensed bands.

According to another implementation, a separate device such as a controller may be utilized to coordinate communication between the small eNodeB and UE and other devices operating on the unlicensed band. The controller may be implemented at, e.g., the small eNodeB or the LTE core network, and may obtain device and channel information from the small eNodeB, UE, external network devices operating on the unlicensed band, and the like. In this way, the small eNodeB or LTE network is connected to the controller, which allocates and manages the spectrum utilization in a given unlicensed band.

The interference avoidance or mitigations steps described herein may be performed not only to identify a suitable unlicensed band, but also to identify a preferred unlicensed band among several unlicensed bands. Accordingly, a rank or priority of unlicensed bands may be compiled such that the small cell eNodeB and/or UE optimize their communications when deciding to utilize an unlicensed band. Further, such steps may be repeated so that the unlicensed bands are re-prioritized over time to further inform the small eNodeB, UE, or controller of an optimal unlicensed band for communication.

With the above in mind, consider the example where a small cell eNodeB serves as an access point for a dense urban area. In doing so, the small eNodeB detects a new UE within its coverage area via, e.g., data received from a neighboring eNodeB and/or the UE itself. During an initiation or handoff procedure, the small cell eNodeB determines the new UE is capable of multi-band communication, including unlicensed communication in one or more ISM bands. The small cell eNodeB further determines traffic density is at or near a threshold (which may be set by the core network, the small eNodeB itself, and the like). Accordingly, the small cell eNodeB sends an instruction or notification (perhaps via a control channel in the license frequency band) that further communication will occur over the unlicensed band. An implementation of this process is described herein with reference to the following Figures.

Figure 3:
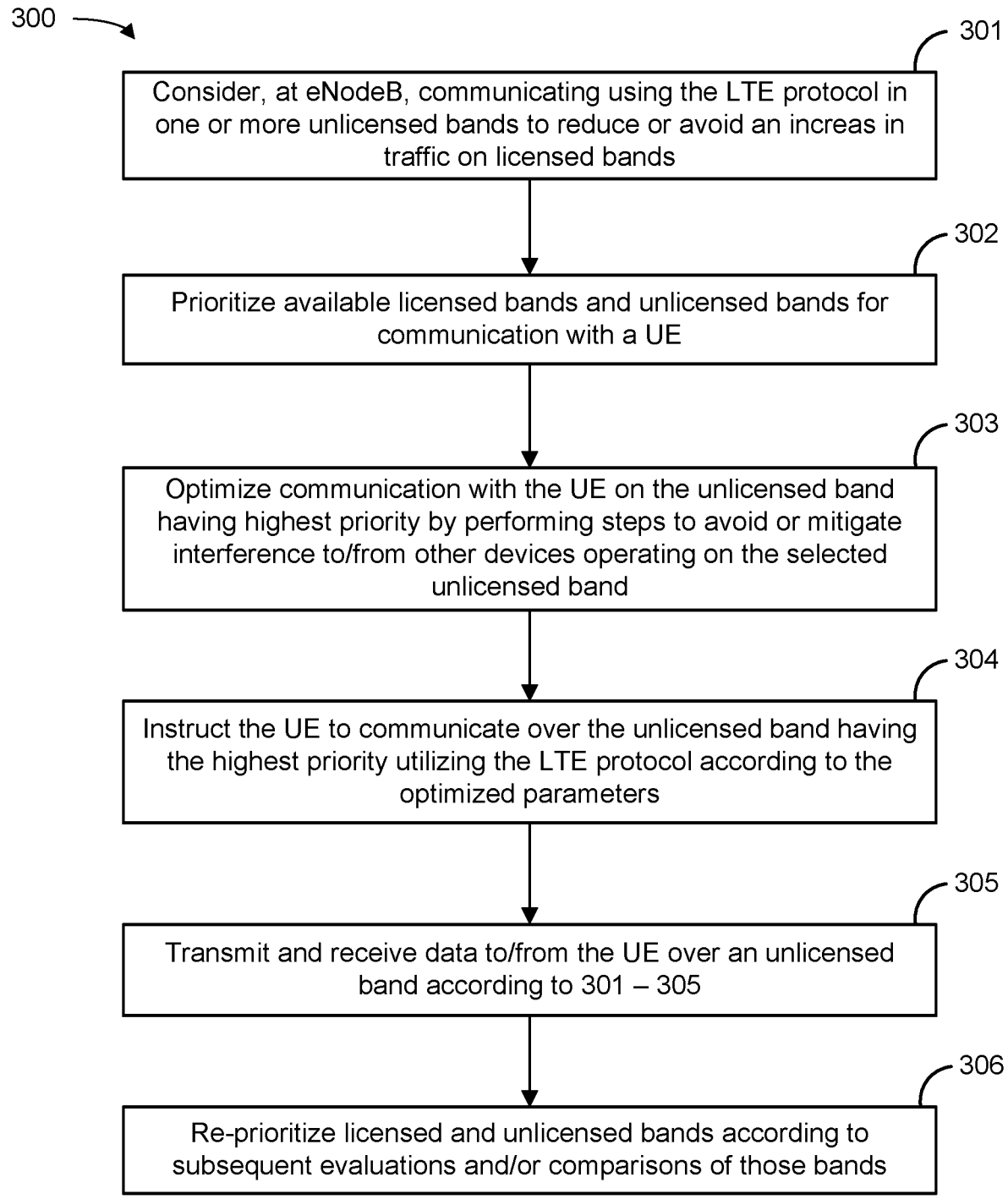
FIG. 3 is a functional block diagram illustrating example blocks executed to implement an aspect of the present disclosure.

FIG. 3 is a functional block diagram 300 illustrating example blocks executed to implement aspects of the present disclosure. At block 301 a small cell eNodeB, such as small cell eNodeB 110e shown in FIG. 1 and operating within a cellular network, considers communicating using the LTE protocol in one or more unlicensed bands to reduce or avoid an increase in traffic on licensed bands. The consideration may be initiated by steps performed at the small cell eNodeB or data received from a UE or controller. For example, the consideration may be initiated upon a request or instruction received from a UE, such as UE 120e, shown in FIG. 1, capable of operating in both licensed and unlicensed bands. In either case, the consideration may originate from an evaluation of channel quality and/or availability for both the licensed and unlicensed bands or a comparison of those qualities between the bands. Such evaluations or comparisons can be performed at either the small cell eNodeB, the UE, or controller and may be based on various metrics. For example, a UE may measure channel and interference information for each band and select or prioritize the bands according to good performance (e.g., a high signal-to-interference plus noise ratio (SINR)). The UE may then transmit the information for each band back to the small cell eNodeB. The small eNodeB may use such information received from one or more UEs to coordinate communication among several UEs in both the licensed and unlicensed bands in a way to maximize capacity without undue burden on the licensed spectrum. It should be appreciated that in addition to information received from the UE, the small cell eNodeB may utilize additional information available at the base station, e.g., the traffic load information on each band, amount of traffic requests queued at the base station for each frequency band, whether frequency bands are overused, and/or how long a UE has been waiting to send information.

At block 302 the small cell eNodeB prioritizes available licensed bands and unlicensed bands for communication with the UE. If the small cell eNodeB determines that each available unlicensed band is not suitable for communication, it may determine no priority can be formed and will initiate or maintain communication with the UE on the licensed band. On the other hand, where a prioritization is appropriate, it may be performed, in part, on the consideration information gathered at block 301. The small cell eNodeB may form a priority between a licensed and unlicensed band, and further form a priority between multiple unlicensed bands. That is, the small cell eNodeB may measure or collect the consideration information at block 301 for several bands (e.g., the 2.4 GHz and 5.8 GHz bands) and determine which is most suitable for communication with the UE. It should be appreciated that the priority may be dynamic, where the small cell eNodeB re-prioritizes the available bands on a periodic or aperiodic basis. Where the priority changes, the eNodeB may initiate steps to switch communications with the UE to another unlicensed band where other considerations so allow.

At block 303 the small cell eNodeB optimizes communication with the UE on the unlicensed band having highest priority. Optimizing the communication involves performing steps to avoid or mitigate interference to/from other devices operating on the selected unlicensed band. Doing so allows the small cell eNodeB and UE to utilize LTE in the selected unlicensed band with little or no modification to the LTE radio stack. As discussed herein, the small cell eNodeB may monitor each unlicensed band to determine availability, signal quality, interference characteristics, and the like on each unlicensed band. The small cell eNodeB may also identify external network devices operating in the unlicensed bands and determine their operating characteristics. As such, the small cell eNodeB minimizes impact to pre-existing unlicensed users by adjusting, e.g., transmit power, carrier aggregation, channel access parameters, etc., for itself and the UE. By way of example, the small cell eNodeB may transmit control information, during both channel access and data transmission phases, on control channels in the licensed band based on the fact that the licensed band is more reliable than the unlicensed band. Also, having knowledge of multiple networks operating in the unlicensed band, the small cell eNodeB may coordinate communications among them using TDD and/or FDD techniques. The small cell eNodeB may further transmit information to a controller located at the core network or collocated at the small cell eNodeB, allowing the controller to facilitate coordination among various devices (e.g., devices on an external network) over the unlicensed band.

At block 304 the small cell eNodeB instructs the UE to communicate over the unlicensed band having the highest priority utilizing the LTE protocol according to the optimized parameters formed by the small cell eNodeB or controller at block 303. The small cell eNodeB may send further instructions regarding, e.g., bandwidth allocation, which coding/modulation rates to use, and the like, based on the steps performed at blocks 301-303.

At block 305 the small cell eNodeB transmits and receives data to/from the UE over an unlicensed band according to blocks 301-305.

At block 306 the small cell eNodeB re-prioritizes licensed and unlicensed bands according to subsequent evaluations and/or comparisons of those bands. Based on those evaluation and/or comparisons, the small cell eNodeB may elect to continue communication with the UE over the currently-used unlicensed band, switch communications to a new higher-ranking unlicensed band, or switch communication to the licensed band. Where a new band is selected, the small cell eNodeB instructs or notifies the UE and/or the controller, causing each to take appropriate steps to effectuate the new selection.

Figure 4:
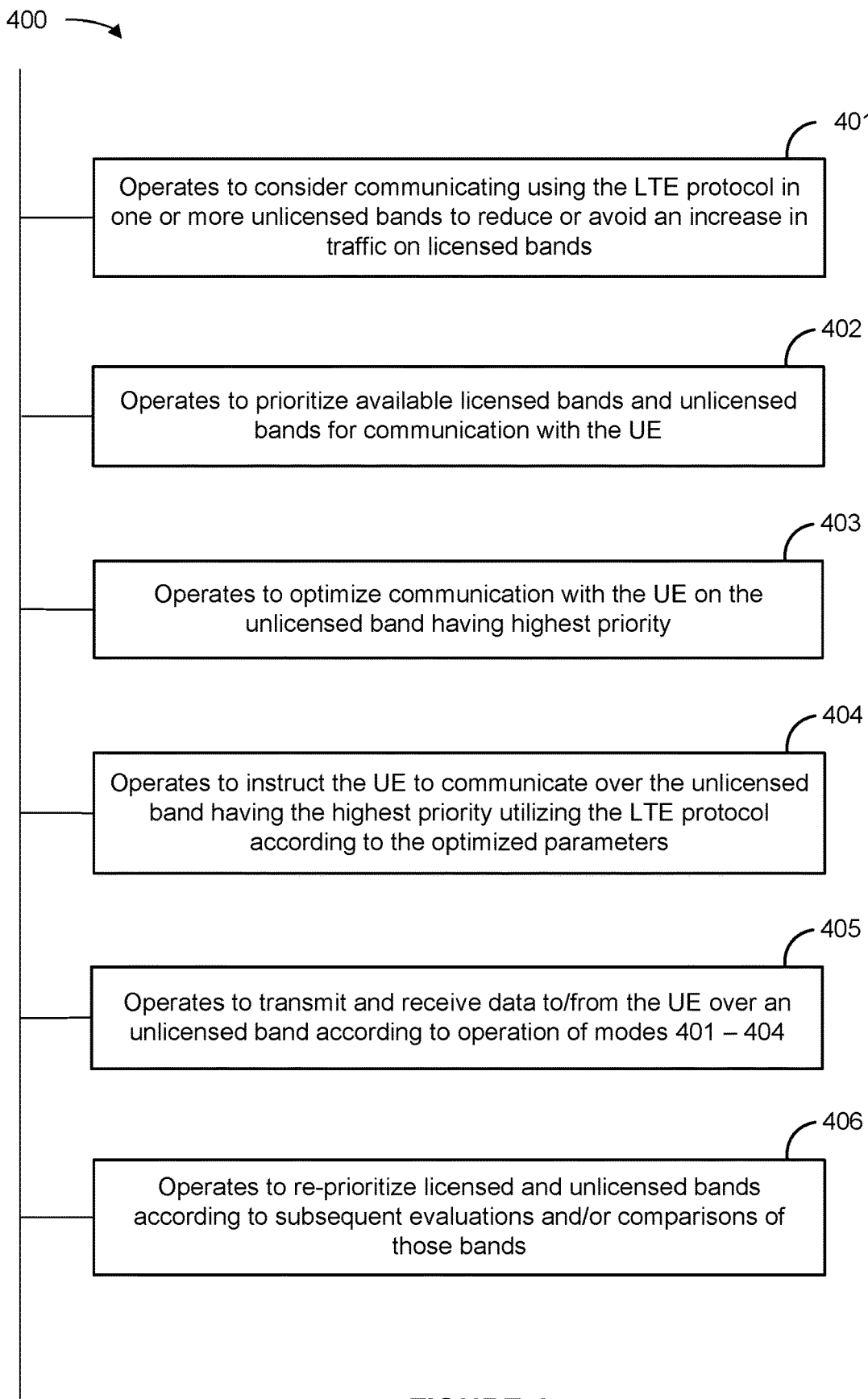
FIG. 4 is a block diagram representation of a wireless communication apparatus configured according to an aspect of the present disclosure.

FIG. 4 is a block diagram illustrating apparatus 400 for wireless communication. Apparatus 400 may include one or more components or portions of small cell eNodeB 110e. Apparatus 400 also includes modules 401, 402, 403, 404, 405, and 406 which are executed to provide operations as described herein. Each of modules 401, 402, 403, 404, 405, and 406 may comprise software, program code, or other logic (e.g., ASIC, FPGA, etc.), as may be operable upon or executed by processor 401 to provide the functions described below.

Module 401 operates to consider communicating using the LTE protocol in one or more unlicensed bands to reduce or avoid an increase in traffic on licensed bands. The consideration may be initiated by steps performed at the small cell eNodeB or data received from a UE or controller. Where the consideration is initiated on data received from the UE, module 401, executed by a processor of apparatus 400, controls the components of apparatus 400 including antennas, demodulators (not shown), and the like to effectuate the consideration. Signals received from a UE and/or data measured at the small cell eNodeB are decoded and processed through execution of module 401 to extract the indication. Module 401 further operates to use information received from one or more UEs, a controller, of information collected at apparatus 400 to coordinate communication among several UEs in both the licensed and unlicensed bands in a way to maximize capacity without undue burden on the licensed spectrum.

Module 402 operates under control of a processor of apparatus 400 to prioritize available licensed bands and unlicensed bands for communication with the UE. If one or more unlicensed bands are suitable for communication, module 402 operates to form a priority among the licensed bands and unlicensed bands and further form a priority among the unlicensed bands. In doing so, module 402 measures or collects the consideration information from module 401 for several bands and determines which is most suitable for communication with the UE.

Module 403 operates under the control or a process or apparatus 400 to optimize communication with the UE on the unlicensed band having highest priority. Doing so allows the small cell eNodeB and UE to utilize LTE in the selected unlicensed band with little or no modification to the LTE radio stack.

Module 404 operates under the control or a process or apparatus 400 to instruct the UE to communicate over the unlicensed band having the highest priority utilizing the LTE protocol according to the optimized parameters formed by the small cell eNodeB. Module 404 further operates to send instructions regarding, e.g., bandwidth allocation, which coding/modulation rates to use, and the like.

Module 405 operates to transmit and receive data to/from the UE over an unlicensed band according to operations of modules 401-404.

Module 406 operates under the control or a process or apparatus 400 to re-prioritize licensed and unlicensed bands according to subsequent evaluations and/or comparisons of those bands. Based on those evaluation and/or comparisons, module 406 further operates to cause apparatus 400 to elect to continue communication with the UE over the currently-used unlicensed band, switch communications to a new higher-ranking unlicensed band, or switch communication to the licensed band. Where a new band is selected, module 406 further operates to instruct or notify the UE and/or the controller, causing each to take appropriate steps to effectuate the new selection.

Figure 5:
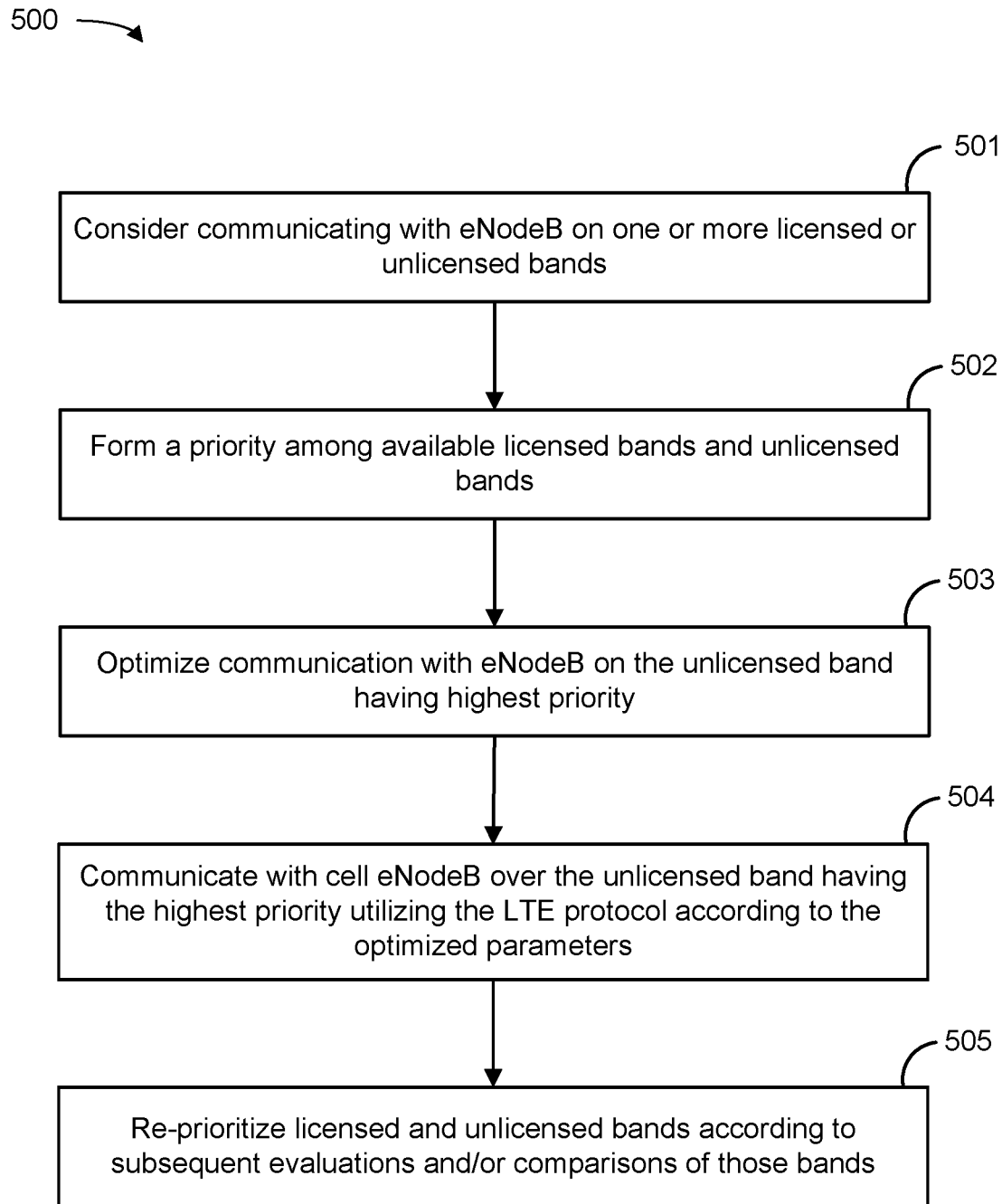
FIG. 5 is a functional block diagram illustrating example blocks executed to implement an aspect of the present disclosure.

FIG. 5 is a functional block diagram 500 illustrating example blocks executed to implement one aspect of the present disclosure. Where a small cell eNodeB such as small cell eNodeB 110e is configured as described above, a UE such as UE 120e may initiate communications using unlicensed frequency bands. At block 501, the UE considers communicating on one or more licensed or unlicensed bands. The consideration may be initiated by steps performed at the UE or data received from a small cell eNodeB or controller. For example, the consideration may be initiated upon a request or instruction received from a small cell eNodeB, capable of operating in both licensed and unlicensed bands. In either case, the consideration may originate from an evaluation of channel quality and/or availability for both the licensed and unlicensed bands or a comparison of those qualities between the bands. Such evaluations or comparisons can be performed at either the small cell eNodeB, the UE, or controller and may be based on various metrics. For example, a UE may measure channel and interference information for each band and select or prioritize the bands according to good performance (e.g., a high signal-to-interference plus noise ratio (SINR)). The UE may then transmit the information for each band back to the small cell eNodeB.

At block 502 the UE forms a priority among available licensed bands and unlicensed bands. The priority may measure or collect the consideration information at block 301 for several bands (e.g., the 2.4 GHz and 5.8 GHz bands) and determine which is most suitable for communication. It should be appreciated that the priority may be dynamic, where the UE re-prioritizes the available bands on a periodic or aperiodic basis. Where the priority changes, the UE may initiate steps to switch communications to another unlicensed band where other considerations so allow. The UE may transmit the priority information described above to a small cell eNodeB and/or controller on a periodic basis or aperiodic basis (e.g., in response to a request for such information from the small cell eNodeB and/or controller or upon the occurrence of a threshold or condition on one or more of the bands).

At block 503 the UE optimizes communication with the small cell eNodeB on the unlicensed band having highest priority. The steps to optimize communications with small cell eNodeB may be performed in response to instructions received from the small cell eNodeB, or may be initiated or performed according to instructions residing at the UE itself. In either event, the optimizing steps monitoring unlicensed bands to determine availability, signal quality, interference characteristics, and the like, allowing the small cell eNodeB and UE to utilize LTE in the selected unlicensed band with little or no modification to the LTE radio stack. The UE minimizes impact to preexisting unlicensed users by adjusting, e.g., transmit power, carrier aggregation, channel access parameters, etc. By way of example, the UE may transmit control information, during both channel access and data transmission phases, on control channels in the licensed band and data on the unlicensed band.

At block 504 the UE to communicates with the small cell eNodeB over the unlicensed band having the highest priority utilizing the LTE protocol according to the optimized parameters. Communications may be initiated upon instructions or notifications received from the eNodeB, or in response to an instruction, notification, or request sent from the eNodeB. The UE may further send preference information to the small cell eNodeB regarding preferred bandwidth allocation, coding/modulation rates, etc., or may receive those parameters from the eNodeB or controller.

At block 505 the UE re-prioritizes licensed and unlicensed bands according to subsequent evaluations and/or comparisons of those bands. Based on those evaluation and/or comparisons, the UE may transmit new priority information to the small cell eNodeB and/or controller to initiate communication on a higher ranking band.

Figure 6:
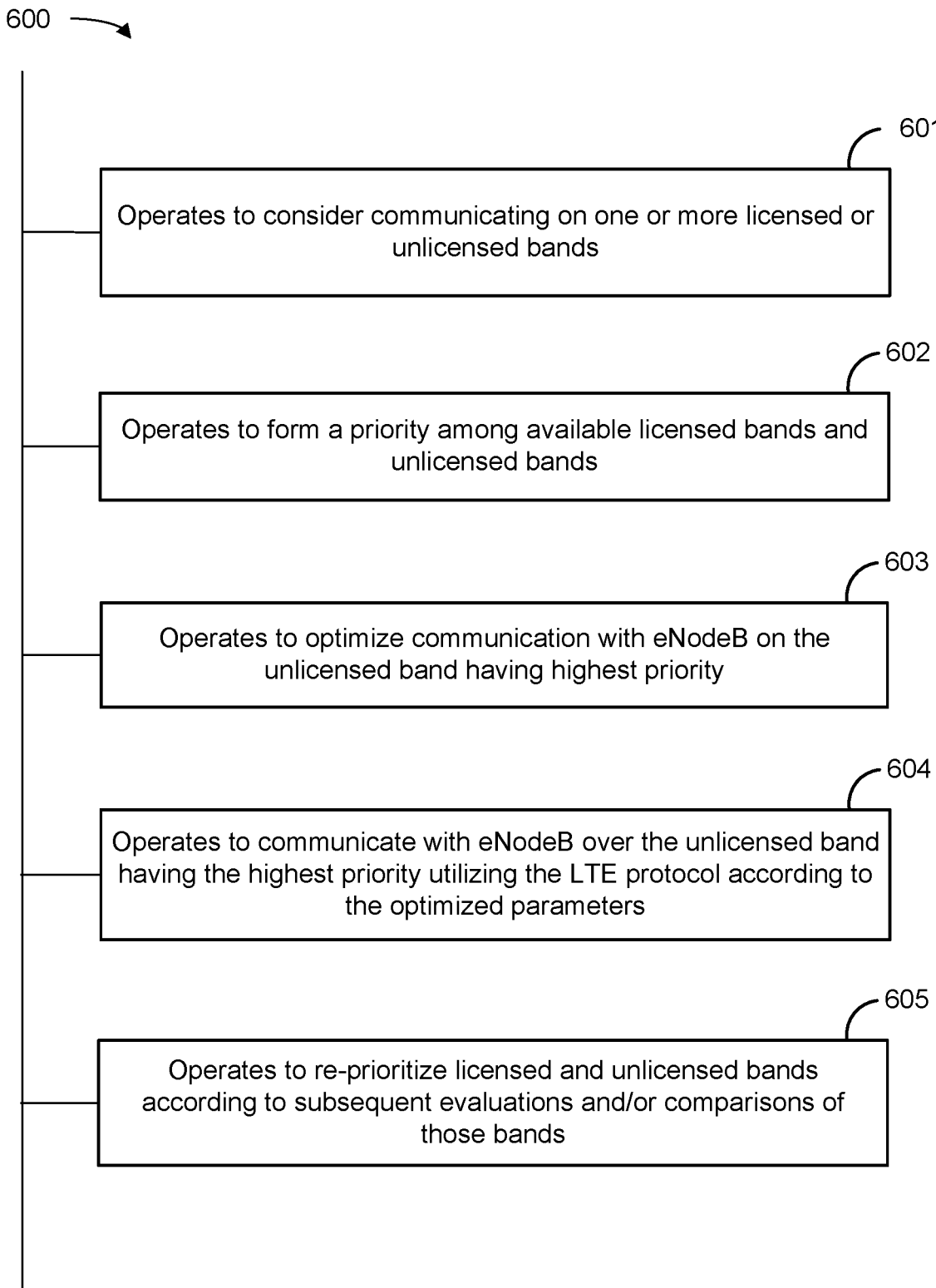
FIG. 6 is a block diagram representation of a wireless communication apparatus configured according to an aspect of the present disclosure.

FIG. 6 is a block diagram illustrating some aspects of an apparatus according to the present disclosure. Apparatus 600 for wireless communication (e.g., one or more components or portions of UE 120e) is configured for communicating over a licensed bands or unlicensed band with a small cell eNodeB. Apparatus 600 includes modules 601, 602, 603, 604, and 605 that cooperate to provide operations as described herein with respect to UEs. Each of modules 601, 602, 603, 604, and 605 may comprise software, program code, or other logic (e.g., application specific integrated circuit (ASIC), field programmable gate array (FPGA), etc.), as may be operable upon or executed using a processor to provide the functions described below.

Module 601 operates to consider communicating on one or more licensed or unlicensed bands. The consideration may be initiated by steps performed at apparatus 600 or data received from a small cell eNodeB or controller. For example, the consideration may be initiated upon a request or instruction received from a small cell eNodeB, capable of operating in both licensed and unlicensed bands. In either case, the consideration may originate from an evaluation of channel quality and/or availability for both the licensed and unlicensed bands or a comparison of those qualities between the bands. Such evaluations or comparisons can be performed at either apparatus 600, a small cell eNodeB, or controller and may be based on various metrics. For example, apparatus 600 may measure channel and interference information for each band and select or prioritize the bands according to good performance (e.g., a high signal-to-interference plus noise ratio (SINR)). Apparatus 600 may then transmit the information for each band back to the small cell eNodeB.

Module 602 operates to form a priority among available licensed bands and unlicensed bands. The priority may measure or collect the consideration information at block 301 for several bands (e.g., the 2.4 GHz and 5.8 GHz bands) and determine which is most suitable for communication. It should be appreciated that the priority may be dynamic, where module 602 operates to re-prioritize the available bands on a periodic or aperiodic basis. Where the priority changes, apparatus 600 may initiate steps to switch communications to another unlicensed band where other considerations so allow.

Module 603 operates to optimize communication with the small cell eNodeB on the unlicensed band having highest priority. Module 603 may optimize communications with small cell eNodeB in response to instructions received from the small cell eNodeB, or may be initiated or performed according to instructions residing at the UE itself.

Module 604 operates to communicate with the small cell eNodeB over the unlicensed band having the highest priority utilizing the LTE protocol according to the optimized parameters. Communications may be initiated upon instructions or notifications received from the eNodeB, or in response to an instruction, notification, or request sent from the eNodeB. Module 604 may further operate send preference information to the small cell eNodeB regarding preferred bandwidth allocation, coding/modulation rates, etc., or may receive those parameters from the eNodeB or controller.

Module 605 operates to re-prioritize licensed and unlicensed bands according to subsequent evaluations and/or comparisons of those bands. Based on those evaluation and/or comparisons, apparatus 600 may transmit new priority information to the small cell eNodeB and/or controller to initiate communication on a higher ranking band.

According to another aspect of the present disclosure, a small cell eNodeB 110e may enable communication with UE 120 by substituting the original licensed air interface within the PHY layer with the unlicensed air interface. That is, small cell eNodeB 110e replaces the LTE-A air interface with one of the ISM, 80211ac, or 802.11n air interface in its PHY layer. In this way, small cell eNodeB 110e may be viewed as a dual-band small cell operating in both licensed and unlicensed bands with an LTE air interface. At the MAC layer, packets are assigned according to, e.g., a predetermined priority or preference. For example, MAC layer packets may be assigned to the band which is not in transmission. If no bands are utilized for transmission, packets may be randomly assigned to one of the bands according to default settings, user preferences, and the like. According to this modification, Small cell eNodeB 110e is seamless in the network by appearing as an unmodified cellular base station to the core network while serving as an unlicensed access point to mobile devices and the like.

Figure 7:
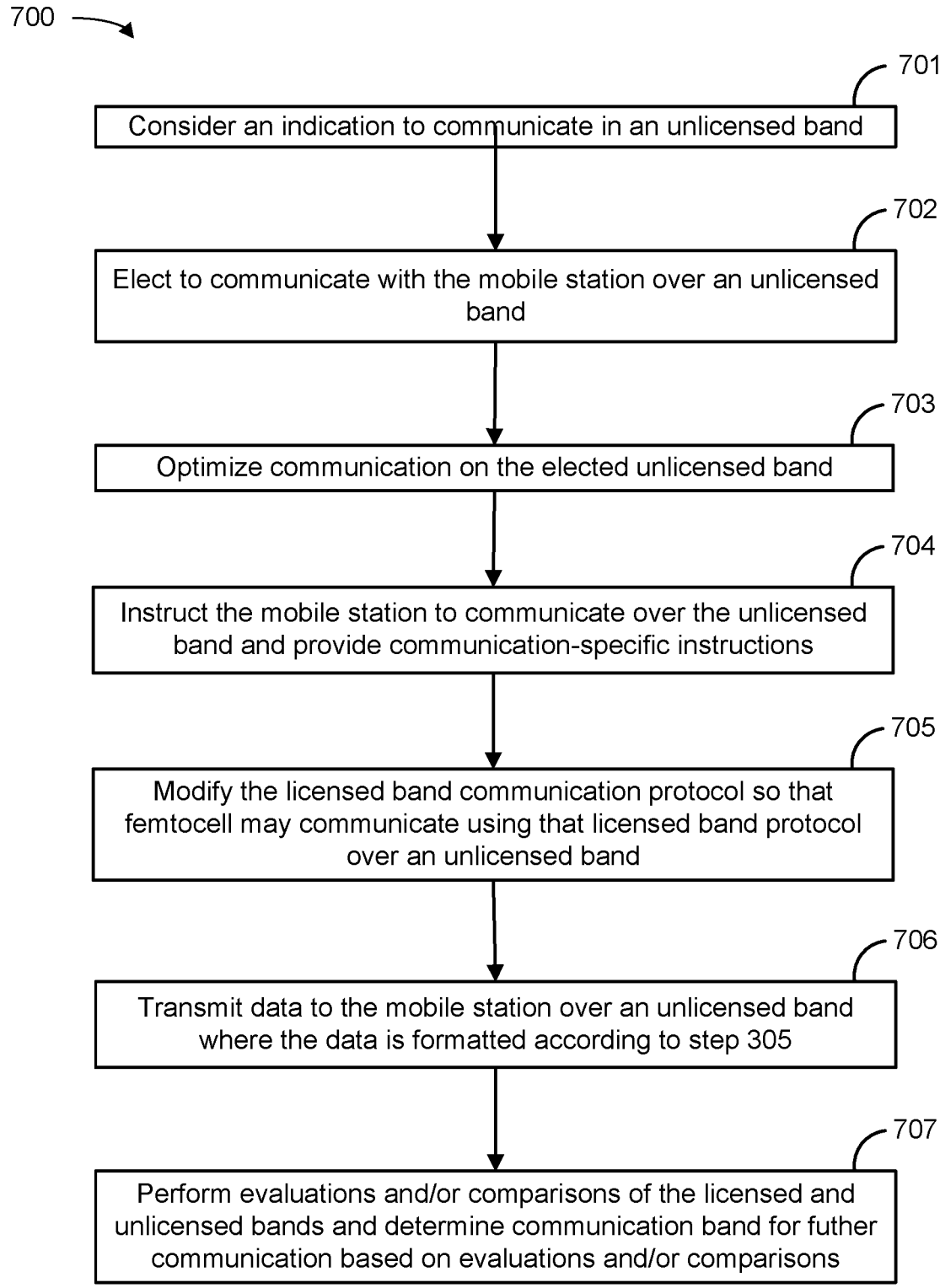
FIG. 7 is a functional block diagram illustrating example blocks executed to implement an aspect of the present disclosure.

FIG. 7 is a functional block diagram 700 illustrating example blocks executed to implement aspects of the present disclosure. At block 701 a small cell eNodeB, such as small cell eNodeB 110e shown in FIG. 1 and operating within a cellular network as an LTE small cell, considers an indication to communicate in an unlicensed band. The indication may be in various forms including, e.g., a request or instruction received from a UE, such as UE 120e, shown in FIG. 1, capable of operating in both licensed and unlicensed bands. The indication may also originate at the small cell eNodeB. In either case, the indication may originate from an evaluation of channel quality and/or availability for both the licensed and unlicensed bands or a comparison of those qualities between the two bands. Such evaluations or comparisons can be performed at either the small cell eNodeB or the mobile device and may be based on various metrics. For example, a UE may measure channel and interference information for each band and select or prioritize the bands according to good performance (e.g., a high signal-to-interference plus noise ratio (SINR)). The UE may then feed the information for each band back to the small cell eNodeB. It should be appreciated that in addition to information received from the UE, the small cell eNodeB may utilize additional information available at the base station, e.g., the traffic load information on each band, amount of traffic requests queued at the base station for each frequency band, whether frequency bands are overused, and/or how long a subscriber has been waiting to send information.

At block 702 the small cell eNodeB elects to communicate with the UE over an unlicensed band. The election may be based on the information discussed above with respect to block 701.

At block 703 the small cell eNodeB optimizes communication on the elected unlicensed band. In doing so, the small cell eNodeB may not only utilize information gathered from the comparisons and/or evaluations between the licensed bands and the unlicensed bands performed at block 701, but may take steps to optimize its communication in view of other devices operating on unlicensed bands. That is, at block 703, the small cell eNodeB minimizes impact to preexisting unlicensed users by adjusting, e.g., channel access parameters for itself and the UE. By way of example, the small cell eNodeB may transmit control information, during both channel access and data transmission phases and the like, on control channels in the licensed band based on the fact that the licensed band is more reliable than the unlicensed band. Also, having knowledge of multiple networks operating in the unlicensed band, the small cell eNodeB may coordinate communications among them using TDD and or FDD techniques.

At block 704 the small cell eNodeB instructs the UE to communicate over the unlicensed band. The small cell eNodeB may send further instructions regarding, e.g., bandwidth allocation, which coding/modulation rates to use, and the like, based on the steps performed at blocks 701 and 703.

At block 705 the small cell eNodeB performs processing to modify the licensed band communication protocol so that it may communicate using that licensed band protocol over an unlicensed band. The processing may be performed by processing logic that may comprise hardware (e.g., dedicated logic, circuitry, etc.), software (such as that which runs on, for example, a general purpose computer system or dedicated machine), or a combination of both such as that described with reference to FIG. 2. According to one aspect, LTE-A is adopted as the cellular air interface for the licensed band and one of, e.g., 802.11ac, 802.11n, ISN is adopted as the air interface for the unlicensed band. In that case, the small cell eNodeB enables communication with mobile device by substituting the original licensed air interface within the PHY layer with the unlicensed air interface. That is, the small cell eNodeB replaces the LTE-A air interface with the, e.g., 802.11ac, 802.11n, ISN air interface in its PHY layer. In this way, the small cell eNodeB may be viewed as a dual-band small cell operating in both licensed and unlicensed bands with an LTE air interface. According to this modification, the small cell eNodeB is seamless in the network by appearing as an unmodified cellular base station to the core network while serving as an unlicensed hotspot or access point to mobile devices and the like.

At block 706 the small cell eNodeB transmits data to the UE over an unlicensed band where the data is formatted according to the processes executed at step 705.

At block 707 the small cell eNodeB performs evaluations and/or comparisons of the licensed and unlicensed bands. Based on those evaluation and/or comparisons, the small cell eNodeB may subsequently elect to continue communication with the UE over the unlicensed band, or may elect to switch communications back to the licensed band. In the event the small cell eNodeB elects to communicate over the licensed band, the small cell eNodeB may perform modified processes executed at block 704 where the unlicensed air interface is replaced with the licensed air interface.

Figure 8:
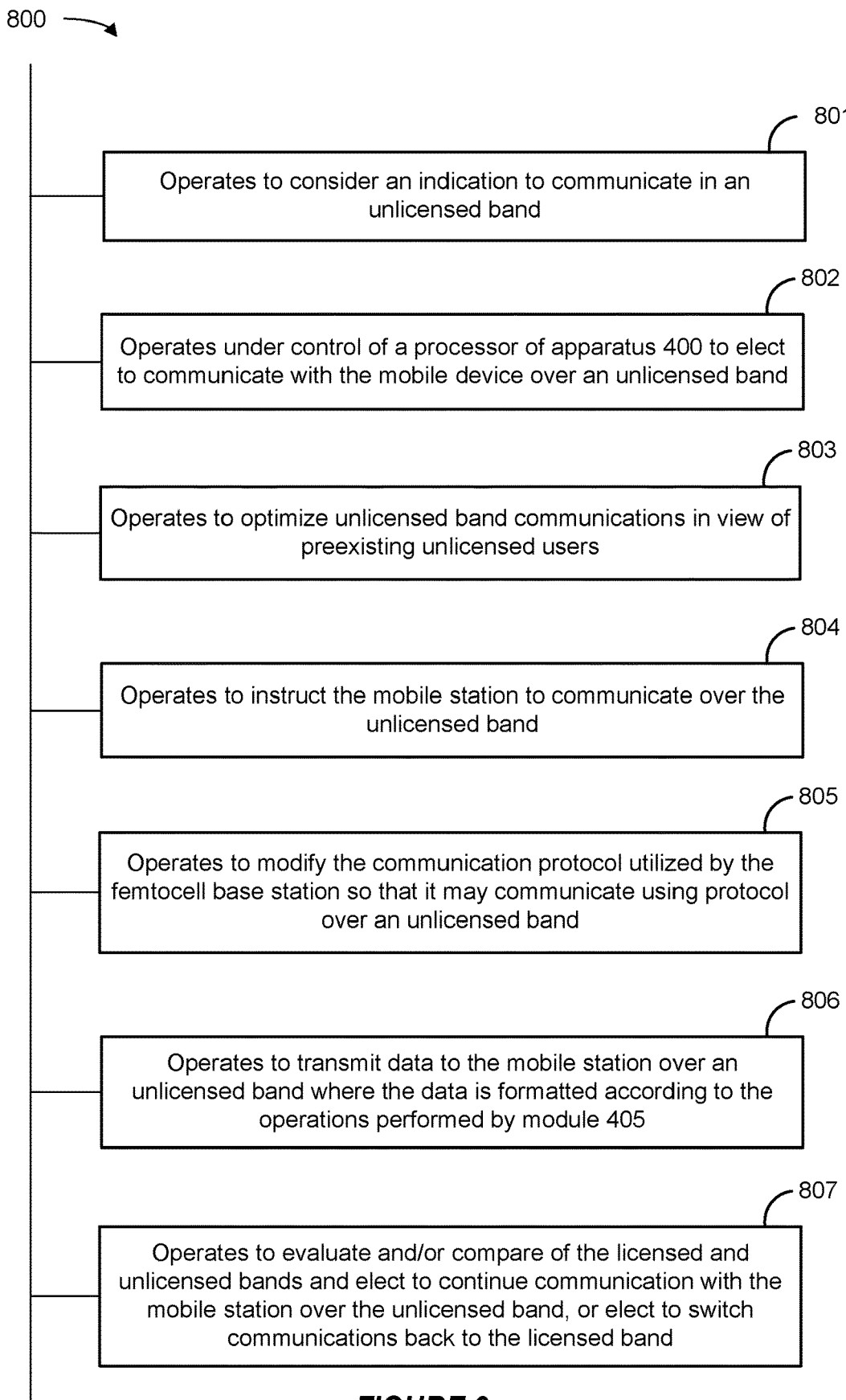
FIG. 8 is a block diagram representation of a wireless communication apparatus configured according to an aspect of the present disclosure.

FIG. 8 is a block diagram illustrating apparatus 800 for wireless communication. Apparatus 800 may include one or more components or portions of small cell eNodeB 110e. Apparatus 800 also includes modules 801, 802, 803, 804, 805, and 806 which are executed to provide operations as described herein. Each of modules 801, 802, 803, 804, 805, and 806 may comprise software, program code, or other logic (e.g., ASIC, FPGA, etc.), as may be operable upon or executed by processor 801 to provide the functions described below.

Module 801 operates to consider an indication to communicate in an unlicensed band. The consideration may be based on data received in an uplink communication from a UE or may be based on information collected at the small cell eNodeB. Where the indication is received from the UE, module 801 executed by a processor of apparatus 800, controls the components of apparatus 800 including antennas, demodulators (not shown), and the like. Signals received from a UE and/or data measured at the small cell eNodeB is decoded and processed through execution of module 801 to extract the indication.

Module 802 operates under control of a processor of apparatus 800 to elect to communicate with the mobile device over an unlicensed band. The election is based on the information discussed above with respect to module 801.

Module 803 operates to optimize unlicensed band communications in view of preexisting unlicensed users. Doing so may be accomplished by adjusting, e.g., channel access parameters for itself and the UE.

Module 804 operates to instruct the UE to communicate over the unlicensed band. The instruction may comprise a notification and additional information. For example, the small cell eNodeB may send further instructions regarding, e.g., bandwidth allocation information, which coding schemes/modulation rates to use, and the like.

Module 805 operates to modify the communication protocol utilized by the small cell eNodeB so that it may communicate using protocol over an unlicensed band. Module 804 further operates to substitute the original licensed air interface within the PHY with the unlicensed air interface. In doing so, module 804 replaces, e.g., the LTE-A air interface with the 802.11n air interface in its PHY layer.

Module 806 operates to transmit data to the UE over an unlicensed band where the data is formatted according to the operations performed by module 804.

Module 807 operates to evaluate and/or compare of the licensed and unlicensed bands. Module 807 further operates to subsequently elect to continue communication with the UE over the unlicensed band, or elect to switch communications back to the licensed band. In the event the small cell eNodeB elects to communicate over the licensed band, the small cell eNodeB may perform modified operations of those performed by module 804 where the unlicensed air interface is replaced with the licensed air interface.

Figure 9:
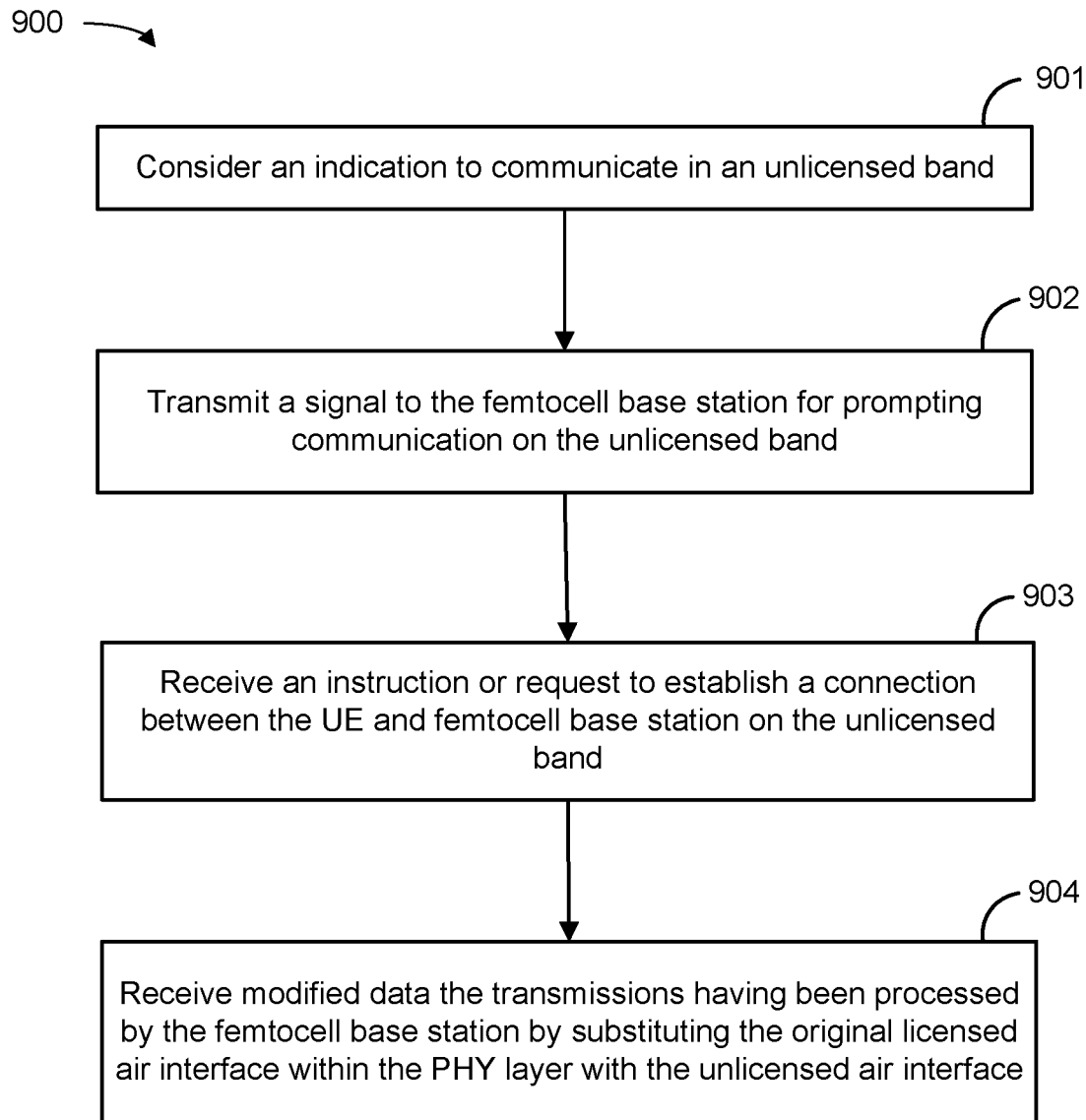
FIG. 9 is a functional block diagram illustrating example blocks executed to implement an aspect of the present disclosure.

FIG. 9 is a functional block diagram 900 illustrating example blocks executed to implement one aspect of the present disclosure. Where a small cell eNodeB such as small cell eNodeB 110e is configured as described above, a mobile device such as UE 120e may initiate communications using unlicensed frequency bands. At block 901 a UE, such as UE 120e shown in FIG. 1 and operating within a cellular network, considers an indication to communicate in an unlicensed band. The indication may be based on information relating to available licensed and unlicensed bands as described above. The indication may further be based on detecting of the presence of an unlicensed small cell eNodeB in proximity to the UE.

At block 902 the UE transmits a signal to the small cell eNodeB for prompting communication on the unlicensed band. The signal prompt may be based on the UE's determined preference for the unlicensed band according to information collected, e.g., as described above.

At block 903 the UE receives an instruction or request to establish a connection between the UE and small cell eNodeB on the unlicensed band. Once the communication is established, the small cell eNodeB may send confirmation and the like as necessary to initiate communications. The initialization data received from the small cell eNodeB may be received in the unlicensed band or licensed band. In either case, the instructions will be sufficient to instruct the UE to continue subsequent communications in the unlicensed band.

At block 904 the UE receives modified data transmissions from the small cell eNodeB. The modified data the transmissions have been processed by the small cell eNodeB by substituting the original licensed air interface within the PHY layer with the unlicensed air interface. In the case described above, the small cell eNodeB replaces the LTE-A air interface with one of, e.g., 802.11ac, 802.11n, ISN air interface in its PHY layer.

Figure 10:
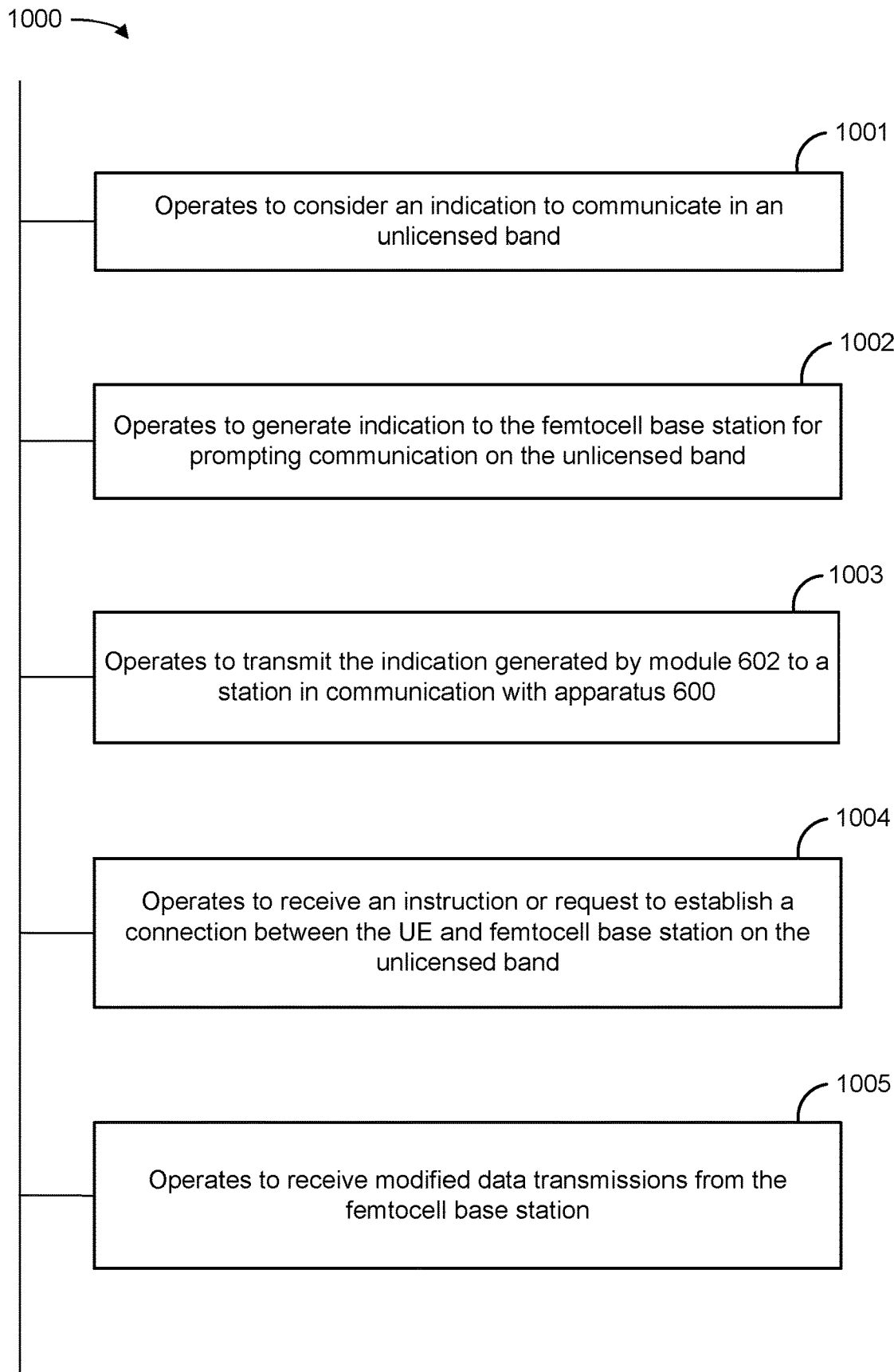
FIG. 10 is a block diagram representation of a wireless communication apparatus configured according to an aspect of the present disclosure.

FIG. 10 is a block diagram illustrating some aspects of an apparatus according to the present disclosure. Apparatus 1000 for wireless communication (e.g., one or more components or portions of UE 120e) is configured for communicating over a licensed band or unlicensed band with a small cell eNodeB. Apparatus 1000 includes modules 1001, 1002, 1003, 1004, and 1005 that cooperate to provide operations as described herein with respect to UEs. Each of modules 1001, 1002, 1003, 1004, and 1005 may comprise software, program code, or other logic (e.g., application specific integrated circuit (ASIC), field programmable gate array (FPGA), etc.), as may be operable upon or executed using a processor 1001 to provide the functions described below.

Module 1001 operates to consider an indication to communicate in an unlicensed band. The indication may be based on information relating to available licensed and unlicensed bands as described above. The indication may further be based on detection of the presence of an unlicensed small cell eNodeB in proximity to the UE.

Module 1002 operates to generate indication to the small cell eNodeB for prompting communication on the unlicensed band. The signal prompt may be based on the UE's determined preference for the unlicensed band according to information collected as described above. The generated indication may comprise an indicator, such as an indicator bit, that corresponds to the UE's preference. For example, an indicator bit corresponding to the UE's preference among available bands and/or subchannels be set to 1 to indicate preference of an unlicensed band. On the other hand, that bit may be set to 0 to indicate preference of a licensed band.

Module 1003 operates to transmit the indication generated by module 1002 to a station in communication with apparatus 1000 (e.g., base station 110e). According to one aspect, module 1003 causes apparatus 1000 to transmit the indication on a periodic basis to ensure that communication between the UE and base station is maintained and optimized over time. Additionally or alternatively, module 1003 may cause apparatus 1000 to transmit the indication periodically, perhaps upon the occurrence of an event or condition, such as handover, loss of power, loss of signal, and the like. Providing such periodic and/or aperiodic transmission of the indicator helps ensure that communications between the apparatus (e.g., UE 120e) and other station (e.g. base station 110e) are optimized over changing conditions.

Module 1004 operates to receive an instruction or request to set up a connection between the UE and small cell eNodeB on the unlicensed band. Once the communication is set up, the unlicensed small cell eNodeB may send confirmation and the like as necessary to initiate communications.

Module 1005 operates to receive modified data transmissions from the small cell eNodeB. The modified data the transmissions have been processed by the small cell eNodeB by substituting the original licensed air interface within the PHY layer with the unlicensed air interface. In the case described above, the small cell eNodeB replaces the LTE-A air interface one of, e.g., 802.11ac, 802.11n, ISN air interface in its PHY layer.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, the method comprising:
   receiving, at a user equipment (UE), control information from a small cell network entity via a licensed band and according to a first communication protocol associated with the licensed band and a first set of parameter values associated with the first communication protocol, the first set of parameter values to configure the UE for communication on the licensed band;
   receiving, at the UE, an instruction from the small cell network entity to communicate on an unlicensed band according to the first communication protocol and an adjusted set of parameter values, the adjusted set of parameter values corresponding to the first set of parameter values after adjusted by the small cell network entity based on operating characteristics of one or more network devices operating on the unlicensed band according to a second communication protocol that is distinct from the first communication protocol; and
   communicating, by the UE, with the small cell network entity via the unlicensed band according to the first communication protocol and the adjusted set of parameter values.

2. The method of claim 1, wherein the first communication protocol comprises a long term evolution (LTE) protocol, and wherein the second communication protocol comprises an Institute of Electrical and Electronics Engineers (IEEE) 802.11 protocol.

3. The method of claim 1, wherein the first set of parameter values comprises a transmit power value, a carrier aggregation value, a channel access parameter value, or a combination thereof.

4. The method of claim 1, wherein the first set of parameter values are adjusted by the small cell network entity to minimize impact to operation of the one or more network devices on the unlicensed band.

5. The method of claim 1, further comprising:
   measuring, at the UE, channel conditions of a plurality of unlicensed bands; and
   ranking, at the UE, the plurality of unlicensed bands based on the channel conditions, the unlicensed band comprising a highest ranked band of the plurality of unlicensed bands.

6. The method of claim 5, further comprising transmitting, from the UE, an indicator of the unlicensed band as a preferred communication band.

7. The method of claim 6, further comprising:
   measuring, at the UE, subsequent channel conditions of the plurality of unlicensed bands at a subsequent time; and
   transmitting, from the UE, an indicator of a second unlicensed band as the preferred communication band based on the second unlicensed band being the highest ranked band at the subsequent time.

8. The method of claim 5, wherein the measuring the channel conditions is performed aperiodically.

9. The method of claim 5, wherein the measuring the channel conditions is performed periodically.

10. The method of claim 5, wherein the measuring the channel conditions is performed continuously.

11. A user equipment (UE) configured for wireless communication, the UE comprising:
    at least one processor; and
    a memory coupled to the at least one processor, where the at least one processor is configured to:
      receive control information from a small cell network entity via a licensed band and according to a first communication protocol associated with the licensed band and a first set of parameter values associated with the first communication protocol, the first set of parameter values to configure the UE for communication on the licensed band;
      receive an instruction from the small cell network entity to communicate on an unlicensed band according to the first communication protocol and an adjusted set of parameter values, the adjusted set of parameter values corresponding to the first set of parameter values after adjusted by the small cell network entity based on operating characteristics of one or more network devices operating on the unlicensed band according to a second communication protocol that is distinct from the first communication protocol; and
      communicate with the small cell network entity via the unlicensed band according to the first communication protocol and the adjusted set of parameter values.

12. The UE of claim 11, wherein the first communication protocol comprises a long term evolution (LTE) protocol, and wherein the second communication protocol comprises an Institute of Electrical and Electronics Engineers (IEEE) 802.11 protocol.

13. The UE of claim 11, wherein the first set of parameter values comprises a transmit power value, a carrier aggregation value, a channel access parameter value, or a combination thereof.

14. The UE of claim 11, wherein the first set of parameter values are adjusted by the small cell network entity to minimize impact to operation of the one or more network devices on the unlicensed band.

15. The UE of claim 11, wherein the at least one processor is further configured to:
    measure channel conditions of a plurality of unlicensed bands; and
    rank the plurality of unlicensed bands based on the channel conditions, the unlicensed band comprising a highest ranked band of the plurality of unlicensed bands.

16. The UE of claim 15, wherein the at least one processor is further configured to initiate transmission of an indicator of the unlicensed band as a preferred communication band.

17. The UE of claim 16, wherein the at least one processor is further configured to:
    measure subsequent channel conditions of the plurality of unlicensed bands at a subsequent time; and
    initiate transmission of an indicator of a second unlicensed band as the preferred communication band based on the second unlicensed band being the highest ranked band at the subsequent time.

18. The UE of claim 15, wherein the at least one processor is configured to measure the channel conditions aperiodically.

19. The UE of claim 15, wherein the at least one processor is configured to measure the channel conditions periodically.

20. The UE of claim 15, wherein the at least one processor is configured to measure the channel conditions continuously.

* * * * *